United States Patent

[11] 3,568,743

| | | |
|---|---|---|
| [72] | Inventor | Raoul Dulieu<br>Les Chesnez (Yonne), France |
| [21] | Appl. No. | 792,688 |
| [22] | Filed | Jan. 21, 1969 |
| [45] | Patented | Mar. 9, 1971 |
| [32] | Priority | July 3, 1968 |
| [33] | | France |
| [31] | | No157,641 |

[54] CORING DEVICE FOR PINEAPPLE SIZING MACHINES
6 Claims, 9 Drawing Figs.

[52] U.S. Cl. ............................................................ 146/6
[51] Int. Cl. ............................................................ A23n 3/12,
A23n 7/00
[50] Field of Search ............................................. 146/8, 52

[56] References Cited
UNITED STATES PATENTS

| 1,060,750 | 5/1913 | Ginaca .......................... | 146/6 |
| 2,969,098 | 1/1961 | Creed ........................... | 146/52 |
| 3,232,328 | 2/1966 | Aubery et al. ................. | 146/6 |

*Primary Examiner*—Willie G. Abercrombie
*Attorney*—Young and Thompson

ABSTRACT: A coring device for a machine which serves to size pineapples by means of a rotary cutter against which the fruits to be sized are thrust axially, a tubular coring cutter being mounted in substantially coaxial relation with said rotary sizing cutter on a sliding carriage to which is imparted an axial reciprocating movement. The coring cutter is essentially provided with axially parallel grooves formed in the outer surface of the cutter near the fruit-cutting edge in order to prevent any rotational motion of the fruit during the simultaneous operations of coring and sizing.

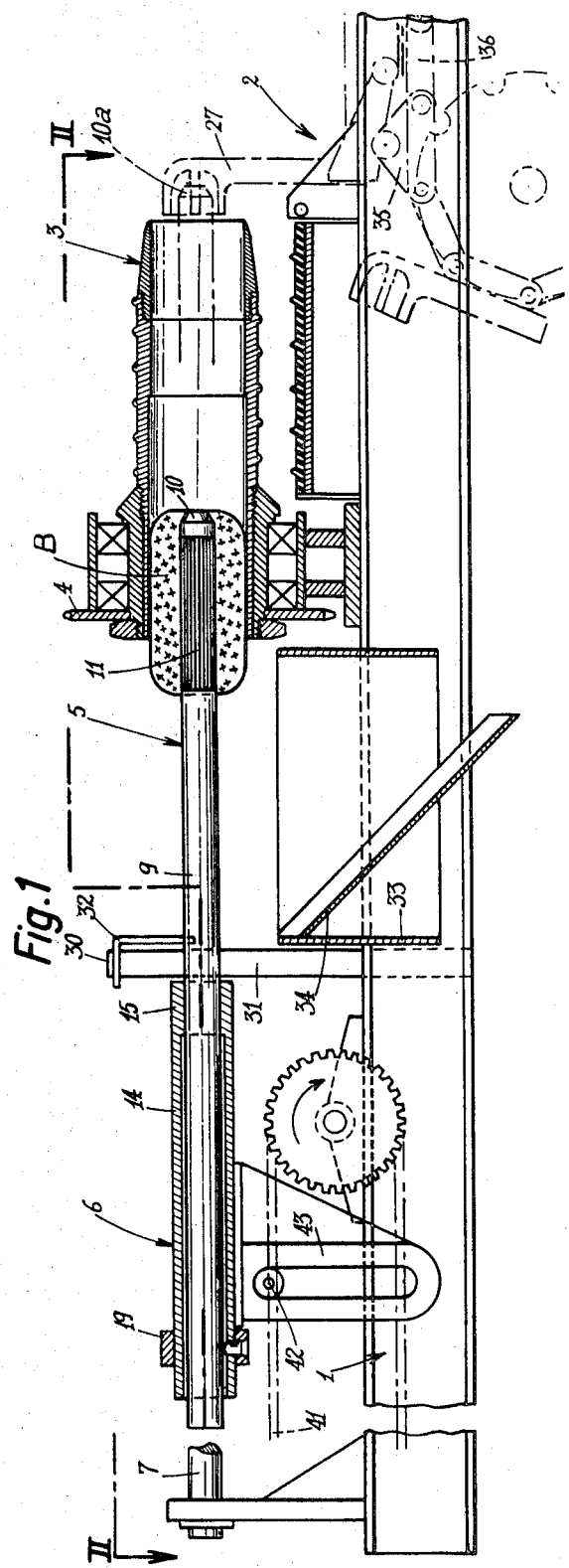

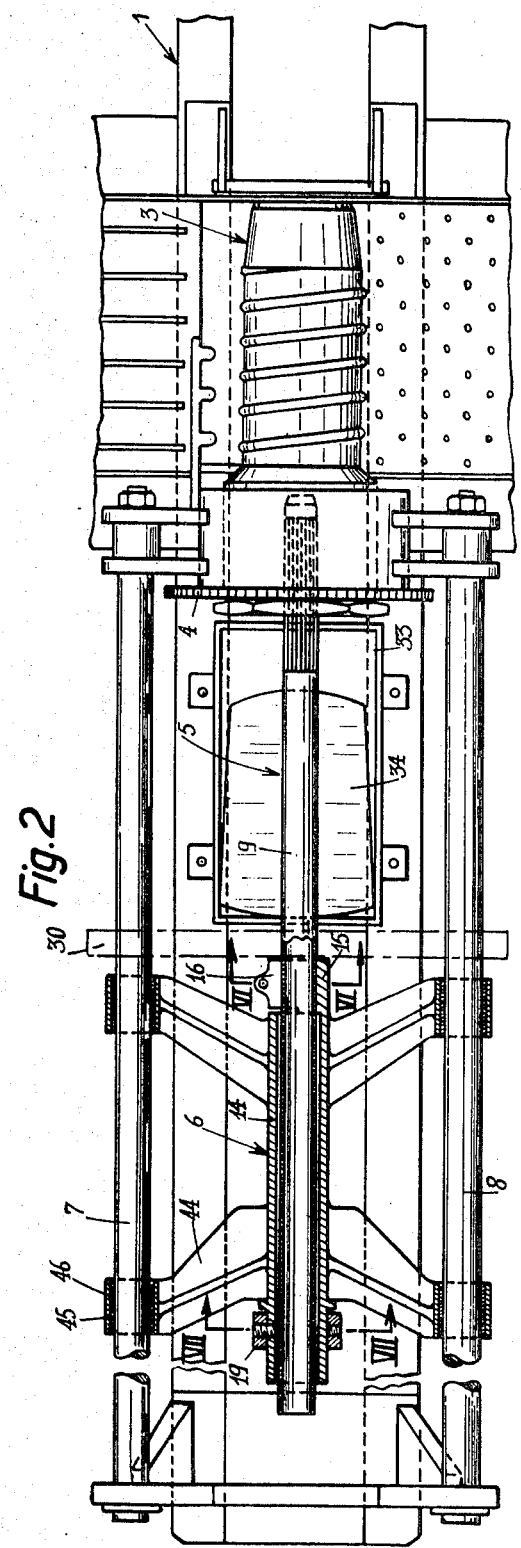

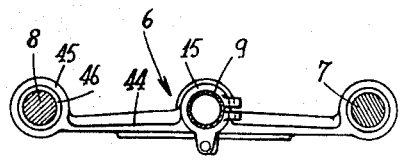
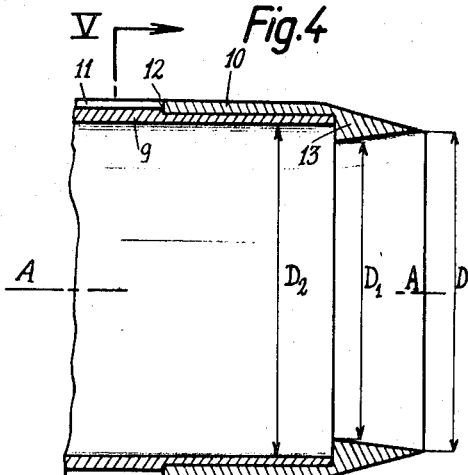
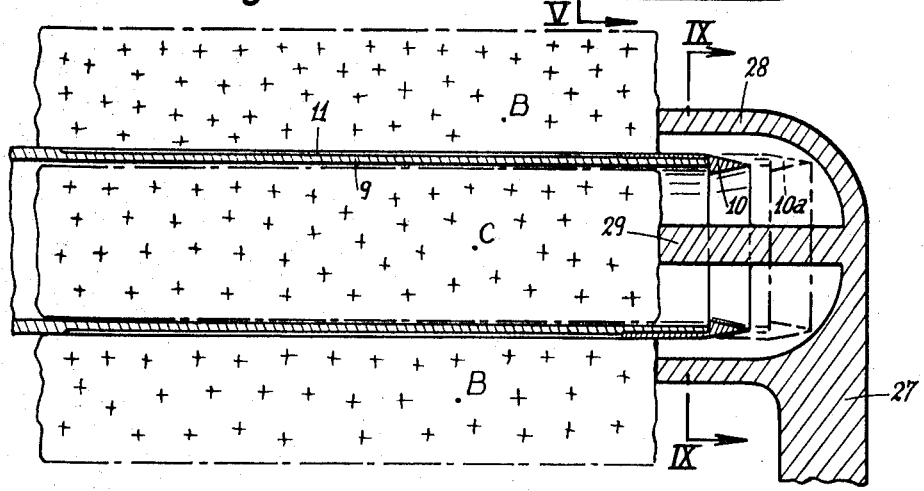

INVENTOR
RAOUL DULIEU

CORING DEVICE FOR PINEAPPLE SIZING MACHINES

The present invention relates to an improved coring device for a machine which serves to size pineapples. The term "coring device" as used in this specification refers to a device for cutting out and removing pineapple cores. This is an essential operation which arises from the fact that the core or central portion of a pineapple is known to be unfit for consumption owing to its woody consistency and therefore has to be removed from the fruit at the time of sizing.

The coring device under consideration is primarily intended to be incorporated in a pineapple sizing machine and accordingly comprises a rotary tubular cutter which is mounted on a frame and the front portion of which is provided with a sharp cutting edge. The pineapple fruits are pushed towards said rotary tubular cutter and coaxially with respect to this latter. The sizing cutter thus penetrates between the shell and the pulp of the fruit and, in the course of this process, sizes the fruit in the shape of a cylinder.

The coring device which is provided by the invention comprises in known manner a nonrotating tubular cutter or so-called coring cutter which is substantially coaxial with the rotary sizing cutter and mounted on a carriage which is adapted to slide on the frame of the machine at the end remote from the inlet of the cutter. A drive mechanism is designed to impart a reciprocating movement to the carriage which is synchronized with the forward motion of the fruits towards the rotary sizing cutter.

Moreover, the head of the fruit must be prevented from accompanying the movement of rotation of the sizing cutter while its rear portion is retained in a fixed angular position as this would subject the fruit to a twisting effort which would prove detrimental to its preservation. In a design which has been proposed in the prior art, the machine has been provided for this purpose with a fruit pricker consisting of a collar which is adapted to slide over the coring cutter and terminates in two front claws. The collar is urged in the forward direction by helical springs, said springs being applied against the carriage on which the coring cutter is mounted. As soon as the coring cutter has penetrated into the fruit to a given depth, the claws prick the pulp of the pineapple and prevent this latter from rotating about its own axis.

While this system has proved generally satisfactory, it has been found to suffer from certain disadvantages.

In the first place, the penetration of the claws of the fruit pricker into the pulp of the fruit is liable to injure the head end of the fruit to a slight extent. In addition, the action of the fruit pricker only begins at the moment when the coring cutter has already penetrated into the fruit to a substantial extent. In consequence, the pricking action may be somewhat slow and take place only when the fruit has already begun to be deformed as a result of twisting.

In the second place, the arrangement of the fruit pricker with its springs on the coring cutter results in an increase in the length of the cutter. This in turn increases the inertia of the moving system as well as the dangers of deformation of the coring cutter due to bending stresses.

Finally, the fruit pricker calls for adjustment as a function of the mean length of the fruits to be sized, which constitutes a limitation of performance.

The improved coring device which is contemplated in this invention is intended to overcome the disadvantages and limitations referred to.

According to the present invention, the coring device for a machine which serves to size pineapples by means of a rotary tubular cutter against which the fruits to be sized are thrust axially comprises a tubular coring cutter which is substantially coaxial with the rotary sizing cutter and mounted on a sliding carriage to which is imparted an axial reciprocating movement. Said device is essentially distinguished by the fact that the coring cutter is provided with a series of axially parallel grooves formed in the outer surface thereof and in the vicinity of the front opening thereof which serves to cut the fruits.

A remarkable fact which has become apparent is that, despite the soft consistency of the fruit pulp, any rotational motion of the fruit is effectively prevented by means of grooves of small depth which are formed in the coring cutter.

The means thus provided accordingly dispense with the need for a fruit pricker.

In a preferred embodiment of the invention, the coring cutter is provided in the vicinity of its front opening with an annular shoulder which projects towards the interior of the tube and is intended to displace the core of the fruit in a uniform manner when the carriage carries out a movement of withdrawal.

Further properties of the invention will be brought out by the description which follows below.

One application of the invention to a machine for sizing and coring pineapple fruits in a single operation is shown by way of non-limitative example in the accompanying drawings, in which:

FIG. 1 is a side elevational view on a small scale in which the machine is shown in cross section along the vertical plane of symmetry but in which the components for feeding the fruit and the components for driving the moving elements are not illustrated;

FIG. 2 is a corresponding plan view taken partly in section along the line II–II of FIG. 1;

FIG. 3 is an end view of the sliding carriage;

FIG. 4 is a longitudinal sectional view on a large scale showing the front portion of the coring cutter;

FIG. 8 is a longitudinal sectional view showing the coring cutter near the end of its active travel and the thrust-arm which is intended to apply the fruit against the coring cutter;

Figure 5:
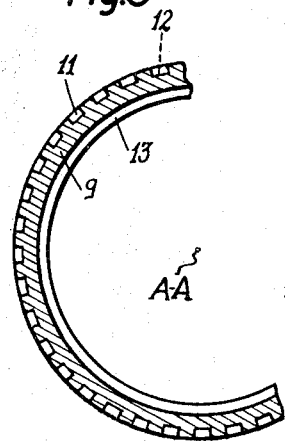
FIG. 5 is a transverse sectional view showing the same cutter, taken along line V–V of FIG. 4.

Reference will now be made to FIGS. 1, 2 and 3 which show a portion of the machine for sizing pineapple fruits. The bench of the sizing machine is indicated at 1 and the end portion of the system for feeding and centering fruits is indicated at 2. The sizing cutter 3 is driven in rotation by means of a chain (not shown in the drawings) which is in mesh with the sprocket 4. The coring cutter 5 is mounted on a carriage 6 which is adapted to slide along two guide rods 7 and 8. The carriage 6 is endowed with a back-and-forth movement by means of an endless drive chain 41, a cleat 42 being carried by said chain and engaged in a vertical guide 43 which is rigidly fixed to the carriage 6.

In accordance with the invention, the coring cutter 5 comprises (as shown in FIGS. 4 and 5) a cylindrical tube 9, the diameter of which corresponds to that of the pineapple core to be extracted and the axis A–A of which coincides substantially with that of the sizing cutter 3. The front portion of the tube 9 is fitted with an endpiece 10 which is formed of high-strength steel and provided with a cutting edge. Longitudinal grooves 11 are cut in the outer face of the tube 9 from the rear edge 12 of the endpiece 10 and only over a distance equal to a fraction of the maximum length of the pineapples to be sized, this distance being, for example, 20 centimeters for a maximum length of fruits of 35 centimeters.

By way of example, said grooves can be seven-tenths of a millimeter in depth and between 1.5 and 2.5 millimeter in width. The external diameter of the endpiece 10 in the rear portion thereof is equal to that of the tube 9. Starting from the cutting edge of the endpiece 10, the internal diameter of said endpiece will gradually decrease towards the rear and is slightly smaller than the internal diameter of the tube 9 at the point of junction thereof with the front end of said tube. In consequence, the endpiece 10 forms an annular shoulder 13 inside the tube 9. By way of example, the height of said shoulder can be five-tenths of a millimeter. Moreover, if the reference D designates the diameter of the leading edge of the endpiece 10, the reference $D_1$ designates the internal diameter of the annular shoulder 13 and the reference $D_2$ designates the internal diameter of the tube 9, the diameter D is comprised between $D_1$ and $D_2$.

Figure 6:
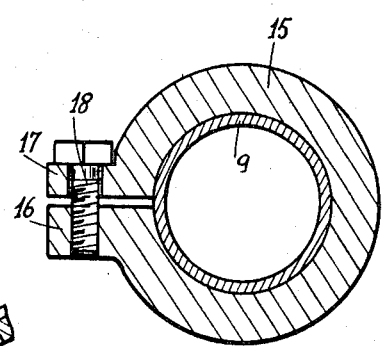
FIG. 6 is a transverse sectional view of the same cutter at the level of the clamping collar, this view being taken along line VI–VI of FIG. 2.
Figure 7:
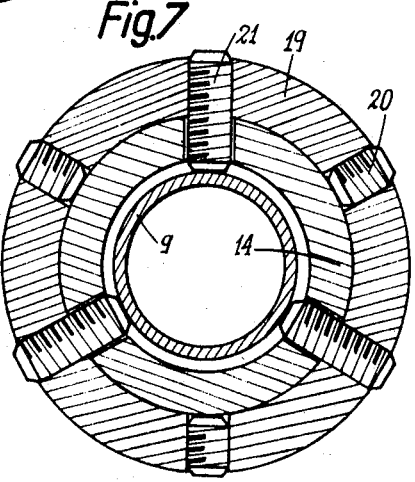
FIG. 7 is a transverse sectional view of the same cutter at the level of the adjusting ring, this view being taken along line VII–VII of FIG. 2.

At the rear end thereof, the tube 9 is detachably mounted with a small amount of radial play within a sleeve 14 which forms part of the carriage 6 in such a manner that the axis of the tube 9 can be inclined at a small angle with respect to the axis of the sleeve 14. As shown in FIG. 6, there is formed at the front end of the sleeve 14 a split clamping-collar 15 having two ears 16 and 17 which are coupled by means of a clamping screw 18 which serves to vary the spacing of said ears. As shown in FIG. 7, there is disposed at the rear end of the sleeve 14 an adjusting ring 19 in which six radial bores are pierced and internally-threaded, said bores being located at uniform intervals in a plane at right angles to the axis A-A: three of said bores are fitted with headless set screws 20 which are applied against the sleeve 14; the three remaining bores which are arranged in alternate relation with the first three bores are in register with bores formed in the sleeve 14 and are applied against the tube 9. The sleeve 14 is carried by ribbed radial arms 44 attached to collars 45 which are adapted to slide along the guide rods 7 and 8 by means of friction linings 46.

In the example herein described, the rear end of the tube 9 is open and serves to discharge cutout cores as will be explained hereinafter. The corresponding opening can be fitted with any suitable ejector system in order to assist the removal of the cores and their subsequent delivery, for example, into a receiving hopper.

Figure 9:
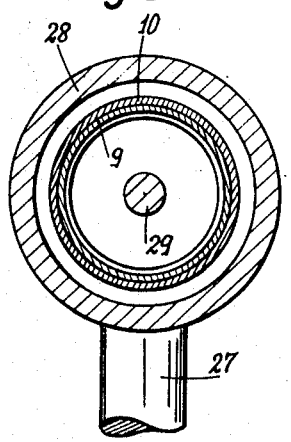
FIG. 9 is a transverse sectional view of the same components taken along line IX–IX of FIG. 8.

Referring now to FIGS. 8 and 9, there is again shown the thrust-arm 27 of the feed unit which, in a known manner, is pivotally mounted on a driving carriage shown diagrammatically at 35, said carriage being mounted on a driving chain 36. During its active travel, the thrust-arm 27 is applied against the end of the pineapple by means of a cup 28 and a central stud 29 which is coaxial with the coring cutter 3.

AT the end of its active travel, the thrust-arm 27 withdraws by rotating about its driving carriage 35.

The machine is additionally provided in front of the carriage 6 with a stop 30 (as shown in (FIGS. 1 and 2) for the purpose of extracting fruits which have been processed. Said stop is constituted by a gantry 31 which is fixed on the bench 1 of the machine and fitted with a top nose 3 which corresponds in shape to the sleeve 14. A box 33 for receiving fruits is placed in front of the stop 30 and beneath the tube 9, said box being also fixed on the bench 1 and containing a chute 34.

The system for driving the carriage 6 is so designed that, in the position of maximum forward travel thereof and at the end of the active travel of the coring cutter 5, the cutting endpiece 10 moves to a position 10a FIGS. 1 and 8) which is located at a point slightly in front of the leading edge of the calibrating cutter 3. At the other end of its travel, the endpiece 10 is located at a small distance to the rear of the stop 30.

The operation of the machine as thus constituted is as follows:

When a pineapple is pushed towards the sizing cutter 3 by means of the thrust-arm 27 in a known manner and comes into contact with the edge of said sizing cutter, the fruit is cut cylindrically beneath its shell. The centering system, the end portion 2 of which is shown in FIG. 1, applies the fruit against the sizing cutter 3 during its introduction and thus prevents it from rotating.

While the fruit moves forward through the sizing cutter 3, the coring cutter 5 moves forward in the opposite direction towards the sizing cutter and the coring-cutter endpiece 10 penetrates into the head of the fruit. As soon as the coring cutter 5 has penetrated to a distance which is greater than the length of the endpiece 10, the pulp of the fruit is accordingly forced into the grooves 11 as a result of the pressure to which it is subjected by the sizing cutter 3 and the rear portion of the endpiece 10. The pulp is thus forcibly pressed into the grooves 11 and adheres completely to the coring cutter 5.

The mechanisms for actuating the coring cutter 5 and thurst-arm 27 are so adjusted that, if the endpiece 10 has reached the end-of-travel position 10a, the thurst-arm 27 has moved forward to a sufficient extent while pushing the pineapple to ensure that the whole length of the fruit has passed through the coring cutter 5. At this moment, the mechanism which actuates the thrust-arm 27 causes the withdrawal of this latter and the coring cutter 5 begins its backward movement and is accompanied in this movement by the pineapple which has been stripped of its shell under the action of the sizing cutter.

Thereupon, the end of the cylinder B which has been cut in the fruit is engaged with the grooves 11, thereby playing a part in preventing any movement of rotation of said fruit cylinder B.

The fruit core C which has been completely cutout also and which has been thrust back into the interior of the coring cutter 5 in which it is firmly retained by means of the annular shoulder 13 is also moved back in the same manner. As the withdrawal of the coring cutter continues, the sized fruit cylinder B is drawn out of the sizing cutter 3 and the head end of said cylinder comes up against the nose 32 of the stop 30, the movement of the fruit being thus arrested. When the coring cutter 5 has moved clear, the cylinder B drops onto the chute 34, then into the receiving box 33 and can then be transferred in particular to devices of any suitable type for cutting off the ends of the fruit.

The pineapple core C has remained inside the tube 9 of the coring cutter 5. Progressively as the successive fruits are processed, the cores thrust each other back and move towards the opening of the tube 9 which is remote from the endpiece 10. The cores C are thus discharged in respect of a position of the coring cutter 5 which always remains the same.

Should the coring cutter 5 not engage precisely at the center of the fruit during its active travel, the orientation of the cutter must accordingly be corrected so as to cause the axis A-A of the tube 9 to coincide with that of the sizing cutter. To this end, the clamping screw 18 of the split collar 15 (shown in FIG. 6) is first slackened off so as to permit the ears 16 and 17 to open slightly, thereby providing the tube 9 with a small amount of play within the collar 15. The position of the tube 9 can then be corrected by producing action on the three adjusting screws 21 of the adjusting ring 19 (shown in FIG. 7) and the tube 9 is secured in its new position by tightening the clamping screws 18 of the split collar 15.

By virtue of this system of adjustment and the reduction in length of the tube 9 which is permitted by the elimination of the fruit pricker, the precision of the machine is enhanced and its production rate can be increased to 100 fruits per minute instead of the rate of approximately 50 per minute which was attained by machines of the prior art. Moreover, any losses of time which sometimes occurred in the past as a result of irregular progression of the cores C within the tube 9 after removal of these cores from the fruit are now avoided by virtue of the internal annular shoulder 13 of the coring cutter 5.

The coring device is also designed to ensure that the overhang of the cutter tube 9 is, for example, only 35 cms, namely only the maximum length which is provided for the fruits to be sized.

It is clear that the invention is not limited to the embodiment hereinabove described and that alternative forms of construction may be contemplated for this latter. For example, the back-and-forth movement of the carriage on which the coring cutter is mounted can be produced by means of a double-acting jack instead of an endless chain.

I claim:

1. A coring device for a pineapple sizing machine having a rotary tubular cutter against which the fruits to be sized are thrust axially, said coring device comprising a tubular coring cutter which is substantially coaxial with said rotary cutter and of substantially less diameter than said rotary cutter, said coring cutter being mounted on a sliding carriage for axial reciprocating movement, said coring cutter having a front portion that terminates in a cutting edge and having longitudinal parallel grooves in its outer surface, said grooves terminating a distance behind said cutting edge, said front portion having an internal annular shoulder that extends into the interior of said coring cutter, the diameter of said cutting edge being greater than the internal diameter of said shoulder but less than the internal diameter of said grooves.

2. A coring device as claimed in claim 1, said coring cutter comprising a tube having an open front end, said front portion comprising an end piece secured to the forward end of said tube, said shoulder being formed on said end piece at the front opening of the tube.

3. A coring device as claimed in claim 2, said end piece being in the form of a sleeve extending over said front end of said tube, said shoulder abutting said front end of the tube.

4. A coring device as claimed in claim 3, said diameter of said cutting edge being less than the internal diameter of said tube.

5. A device as claimed in claim 1, wherein the rear portion of the tubular coring cutter is mounted with radial play within a sleeve which is rigidly fixed to the carriage and terminates at the front end in a clamping collar so that the axis of the coring cutter can be inclined at a small angle with respect to the axis of said sleeve.

6. A device as claimed in claim 5, wherein the rear portion of the sleeve is adapted to carry a ring which is clamped thereon and fitted with three set screws which traverse said sleeve and bear on the outer surface of the tubular coring cutter.